July 30, 1968     TSUNEJI SENBOKUYA     3,395,050

SURFACE CONTACTING THERMO-COUPLE

Filed Dec. 1, 1964

INVENTOR.
TSUNEJI SENBOKUYA
BY McGlew and Toren
Attorneys

United States Patent Office 3,395,050
Patented July 30, 1968

1

3,395,050
SURFACE CONTACTING THERMO-COUPLE
Tsuneji Senbokuya, Meguro-ku, Tokyo, Japan, assignor to Anritsu Keiki Kabushiki Kaisha, Tokyo, Japan
Filed Dec. 1, 1964, Ser. No. 414,998
Claims priority, application Japan, Dec. 28, 1963, 38/97,663
4 Claims. (Cl. 136—221)

A thermo-couple for measuring the temperature of a curved or flat surface and assuring adequate contact between the thermo-couple and the surface. The thermo-couple comprises a pair of resilient outwardly curved strip-shaped thermo-elements mounted on a support. On either side of the thermo-elements is a resilient spring element having substantially the same curved shape as the thermo-couple.

The present invention relates to a thermo-couple of the type for measuring surface temperature of a body by contacting a temperature measuring part of the thermo-couple with said body.

According to the present invention there may be provided an improved surface contacting thermo-couple by which the temperature of a convex, concave or a flat surface portion of a body can be measured by pressing a flexible or resilient and outwardly expanded temperature measuring part of the thermo-couple against said surface portion so as to ensure a good thermal contact between said surface and the measuring part of the thermo-couple.

Further, according to the present invention, there may be provided an improved surface contacting thermo-couple in which said flexible or resilient and outwardly expanded temperature measuring part of the thermo-couple is protected from its permanent deformation by one or two resilient supports arranged in substantially parallel relation to said temperature measuring part of the thermo-couple.

An object of the present invention is to provide a thermo-couple having a good thermal contacting character for any surface of the body to be measured, and also having small thermal capacity so as to be able to reach the surface temperature of a body to be measured, in a short period of time.

Another object of the present invention is to provide a thermo-couple in which heat absorption from the surface of the body by two elements of the thermo-couple and the support for said elements is eliminated effectively.

Further object of the present invention is to provide a thermo-couple in which the flexible thermo-couple is protected from being permanently deformed, and also assisted in recovering to its given configuration when released.

The present invention will be better understood from a reading of the following description referring to the accompanying drawings illustrating two examples of the prior art and an embodying of the present invention.

2

Figure 6:
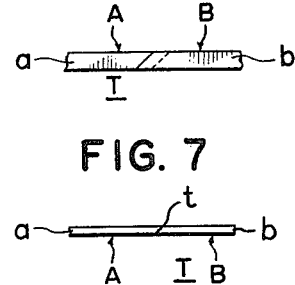
Figure 7:
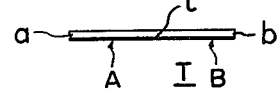

FIG. 6 is a plan view of a part of the thermo-elements,

FIG. 7 is a side view of FIG. 6, and

Figure 8:
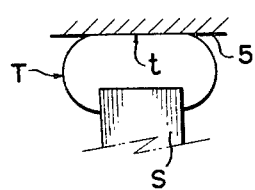
Figure 9:
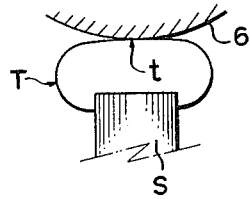
Figure 10:
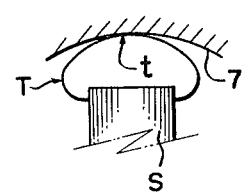

FIGS. 8, 9 and 10 show respectively an operating condition of the thermo-couple of the present invention.

Figure 1:
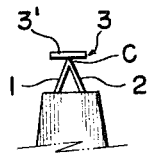
FIG. 1 is a partial front elevation of a thermo-couple of prior art.
Figure 2:
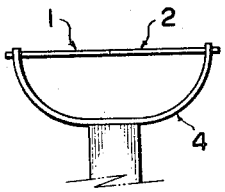
FIG. 2 is a partial front elevation of another type of thermo-copule of the prior art.

The temperature measuring part of the surface contacting thermo-couple of the first example of prior art, shown in FIG. 1, comprises two elements 1 and 2 forming a thermo-couple, a contacting element 3 made of good thermal conducting metal, such as silver, is welded on its one side to said elements 1 and 2 at their junction point C, and external surface 3' of said contacting element 3 serves for contacting with the surface of a body, the surface temperature of which is to be measured. The second prior are example of a surface contacting thermo-couple is shown in FIG. 2, wherein a pair of thermo-elements 1, 2 are welded together and supported by a blow support 4, to provide a linear, or bow supported measuring part.

In general, the surface contacting thermo-couple requires the following: a structure to ensure a close contact between the temperature measuring part of the thermo-couple and the surface of the body to be measured; small thermal capacity for the junction point enabling the point to reach the surface temperature of the body to be measured in a short period of time; and less heat absorption from the surface of the body by the thermo elements and their support.

In the thermo-couples of the first prior art example described above, the following may be understandable from its structure:

Thermo-elements made of wire having large diameter, or metal strip having substantial thickness should be used to ensure close or firm pressing of the thermo element against the surface of the body to be measured, thereby thermal capacity of these thermo elements should inevitably be increased so as to take a long period of time before reaching the surface temperature of the body; further more, small measured values are indicated on a measuring instrument due to the absorption of heat by increased heat conductivity of the thermo elements.

In the second example of prior art described above, the thermo-couple may be usable for the convex surface of a body to be measured, but would not be usable for concave or plane surfaces.

According to the present invention an improved surface contacting thermo-couple, in which said disadvantages of prior arts are all eliminated, may be obtained.

While the temperature measuring part of said prior art thermo-couples is made with substantial rigidity and is pressed firmly against a part to be measured, according to the fundamental feature of the present invention, a flexible or resilient thin strip thermo-couple is used, said thermo-couple is expanded or deflected outwardly i.e., formed into semi-circular shape and is supported on a support, one or two protecting springs or are mounted on said support along one or both sides of said thermo-couple, the thermo-couple is borne on two or more bearing elements made of heat insulating material and mounted on and along said protecting spring so as to bear on them the thermo-couple in its given shape and to protect it against eventual external force and over-pressing, thereby preventing its permanent deformation and assisting in restoring its shape when released.

Figure 3:
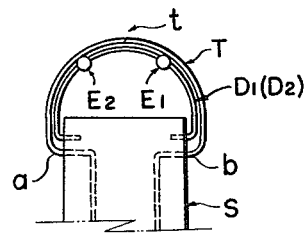
FIG. 3 is a partial front elevation of the thermo-couple according to the present invention.

The present invention will now be explained by referring to FIG. 3 to FIG. 10 in the drawings:

Referring to FIGS. 6 and 7, A and B each denote respectively an element of a thermo-couple of the present invention, one of said elements is made of Chromel and the other of constantan for example, said elements being formed as a strip shaped element of about 0.1 mm. in thickness, and 1.5 mm. in width, and welded at their junction point $t$ to form a thermo-couple T. Said thermo-couple T is expanded outwardly to form a semi-circular arc positioning said junction point $t$ in its apex, and is mounted on an insulating support S by inserting its two end portions $a$, $b$ into said support and fixed thereto, as shown in FIG. 3. Said end portions $a$, $b$ also serve to electrically connect the thermo-couple to a measuring instrument (not shown). Material and design of said support S may be selected in conventional manner.

Figure 4:
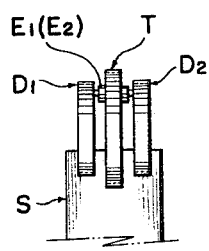
FIG. 4 is a partial side elevation of the thermo-couple shown in FIG. 3.
Figure 5:
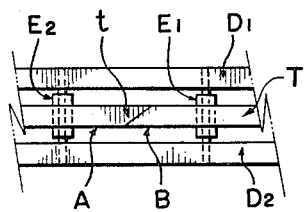
FIG. 5 is a top view of the thermo-couple shown in FIG. 3.

$D_1$ and $D_2$ shown in FIGS. 3, 4 and 5 denote two protecting springs of substantially the same size made for example from a resilient heat-resisting metal of 0.1 mm. in thickness and 1 mm. in width to form a similar configuration to but having a smaller radius of curvature than said thermo-couple T. Springs $D_1$ and $D_2$ arranged in parallel relationship with and spaced substantially equal distances on both sides of said thermo-couple T are mounted on said support S by fixing their ends to said support S. Two or more bearing elements $E_1$, $E_2$, preferably of even number, sheathed with heat resisting and electrically insulating material or coated with similar material, are bridged between said protecting springs $D_1$ and $D_2$ to support the thermo-couple T on the springs, with the junction point $t$ of the thermo-couple spaced substantially equidistantly between the bearing elements $E_1$ and $E_2$.

The operation of the thermo-couple of the present invention is shown in FIGS. 8, 9 and 10, wherein, in FIG. 8 temperature measurement is carried out on a flat surface 5 of a body, in FIG. 9, on a convex or spherical surface 6, and in FIG. 10 in a concave surface 7. In measuring, by pressing the junction point $t$ of the thermo-couple T against the surface of a body whose temperature is to be measured, the thermo-couple T is resiliently deformed depending upon the pressure exerted thereto and according to a surface configuration of the body to make close contact of the junction point $t$ against the surface of the body to be measured as shown in FIGS. 8, 9 and 10, whereby the surface temperature of the body is measured by thermal conduction from the body to the thermo-couple. The protecting springs $D_1$, $D_2$ shown in FIGS. 3, 4 and 5, which are also similarly deformed due to their resiliency and protect the thermo-couple from being permanently deformed, also assist in restoring the thermo-couple to its given configuration when released.

While in the embodiment described above, protecting springs $D_1$ and $D_2$ are arranged on both sides of the thermo-couple T, a single strip arranged on either side of the thermo-couple may be used, in the latter case, however, the free end of the bearing element should be constructed so as to prevent disengaging of the thermo-couple from the free end of the bearing element.

What I claim is:

1. A surface contacting thermo-couple comprising a support, a pair of strip shaped resilient thermo-elements mounted on said support in an outwardly expanded state, a protecting resilient spring element mounted in an outwardly expanded state on said support and disposed parallel to said thermo-elements, and at least two bearing elements made of heat resisting electrically insulating material mounted on said resilient spring element, said thermo-elements constructed and arranged to bear against said bearing elements thereby preventing further deformation of said thermo-elements.

2. A surface contacting thermo-couple comprising a support, a pair of strip shaped resilient thermo-elements mounted on said support in an outwardly expanded state, a pair of protecting resilient spring elements, mounted in an outwardly expanded state on said support and disposed parallel to said thermo-elements and at least two bearing elements made of heat resisting, electrically insulating material mounted on and extending between said pair of resilient spring elements, said thermo-elements constructed and arranged to bear against said bearing elements which in turn are supported by said resilient spring elements and thereby preventing further deformation of said thermo-elements.

3. A surface contacting thermo-couple according to claim 2, wherein said thermo-elements are disposed in a semi-circular outwardly expanded arc and said pair of protecting springs are disposed in a similar semi-circular outwardly expanded arc arranged on each side of said thermo-elements.

4. A surface contacting thermo-couple comprising a support, a pair of strip shaped resilient thermo-elements mounted on said support in a semi-circular outwardly expanded arc, the junction point of said elements located near the apex of the arc, one of said thermo-elements made of Chromel and the other thermo-element made of constantan, a pair of protecting resilient spring elements mounted in a semi-circular outwardly expanded arc on said support and disposed parallel with and on each side of said thermo-elements, and at least two bearing elements made of heat resisting, electrically insulating material mounted on said spring elements, said thermo-elements constructed and arranged to bear against said bearing elements thereby preventing further deformation of said thermo-elements.

References Cited

UNITED STATES PATENTS

| | | | |
|---|---|---|---|
| 1,883,444 | 10/1932 | Albert | 136—221 |
| 1,942,519 | 1/1934 | Packard | 136—221 |
| 2,422,124 | 6/1947 | Obermaier | 136—221 |
| 2,991,654 | 7/1961 | Engelhard | 136—230 X |

ALLEN B. CURTIS, *Primary Examiner.*